United States Patent [19]

Kress et al.

[11] Patent Number: 4,777,212

[45] Date of Patent: Oct. 11, 1988

[54] THERMOPLASTIC POLYCARBONATE MOULDING COMPOSITIONS

[75] Inventors: Hans-Jürgen Kress; Winfried Paul, both of Krefeld; Horst Peters, Leverkusen; Christian Lindner, Cologne; Josef Buekers, Krefeld, all of Fed. Rep. of Germany

[73] Assignee: Bayer Aktiengesellschaft, Leverkusen, Fed. Rep. of Germany

[21] Appl. No.: 933,249

[22] Filed: Nov. 21, 1986

[30] Foreign Application Priority Data

Dec. 3, 1985 [DE] Fed. Rep. of Germany ....... 3542678

[51] Int. Cl.$^4$ .................... C08L 69/00; C08L 83/10
[52] U.S. Cl. .................................... 525/67; 524/100; 524/101; 525/74
[58] Field of Search ............... 525/67, 69, 74, 148, 525/64, 101

[56] References Cited

U.S. PATENT DOCUMENTS 4,393,169  7/1983  Moriwaki et al. ............... 525/67
4,569,970  2/1986  Paul et al. ......................... 525/67

FOREIGN PATENT DOCUMENTS 0135794  8/1984  European Pat. Off. .

*Primary Examiner*—Theodore E. Pertilla
*Attorney, Agent, or Firm*—Connolly and Hutz

[57] ABSTRACT

The present invention relates to thermoplastic moulding compositions comprising polydiorganosiloxane-polycarbonate block copolymers, copolymers of styrene and maleic anhydrides, graft polymers and, where appropriate, further customary additives and a process for preparing these moulding compositions.

12 Claims, No Drawings

THERMOPLASTIC POLYCARBONATE MOULDING COMPOSITIONS

The present invention relates to thermoplastic moulding compositions containing

A. 10 to 95 parts by weight, preferably 25-95 parts by weight, relative to 100 parts by weight of A+B, of polydiorganosiloxane-polycarbonate block copolymer having an average molecular weight $\overline{M}_w$ of 10,000–200,000 and having a content of aromatic carbonate structure units between 75% by weight and 99% by weight, preferably between 85% by weight and 98% by weight and a content of diorganosiloxy units between 1% and 25% by weight, preferably between 2% and 15% by weight, the block copolymers being prepared, starting from polydiorganosiloxanes containing α,ω-bishydroxyaryloxy end groups, with a degree of polymerization $\overline{P}_n$ of 5 to 100, preferably 20 to 80, B. 5 to 90 parts by weight, preferably 5-75 parts by weight, relative to 100 parts by weight of A+B, of a random copolymer of 95-70% by weight, preferably 90 to 75% by weight, of styrene, α-methylstyrene or ring-substituted styrenes or mixtures of said vinyl aromatics and 5-30% by weight, preferably 10-25% by weight of maleic anhydride, C. 0.5 to 4.0 parts by weight, preferably 1.0 to 3.0 parts by weight, relative to 100 parts by weight of A+B, of one or more graft polymers of C.1 5 to 90 parts by weight, preferably 30-80 parts by weight of a mixture of C.1.1 50 to 95% by weight of styrene, α-methylstyrene, ring-substituted styrene, methyl methacrylate or mixtures thereof and C.1.2 50 to 5% by weight of (meth)acrylonitrile, methyl methacrylate, maleic anhydride, N-substituted maleimide or mixtures thereof, on C.2 95 to 10 parts by weight, preferably 70-20 parts by weight, of a rubber having a glass transition temperature $\leq 10°$ C., and, if appropriate, active amounts of flameproofing agents, flow control agents, stabilizers, pigments, release agents and/or antistatics.

Component A. can also be a mixture of polydiorganosiloxane-polycarbonate block copolymers with customary siloxane-free, thermoplastic polycarbonates, in which the total content of diorganosiloxy units in this polycarbonate mixture is again between 1.0% by weight and 25% by weight, preferably between 2% by weight and 15% by weight.

European Offenlegungsschrift No. 0,135,794 (Le A 22,390-EP) discloses mixtures of polydiorganosiloxane-polycarbonate block copolymers, graft polymers and rubber-free thermoplastic vinyl polymers. Possible vinyl polymers also include copolymers of styrene with maleic anhydride (page 10 of the European Offenlegungsschrift). The mixing ratios of the components are 20 to 80 parts by weight of polydiorganosiloxane-polycarbonate block copolymer, 5 to 60 parts by weight of rubber-free thermoplastic vinyl polymers and 70 to 5 parts by weight of graft polymers.

However, it has now been found that, specifically for polydiorganosiloxane-polycarbonate block copolymer mixtures with styrene/maleic anhydride copolymers, even the addition of very small amounts of graft rubber, even in the case of a high copolymer/block copolymer ratio, give rise to products having a very high notched impact strength. These products additionally, and irrespectively of the copolymer/block copolymer ratio, have a very high heat distortion resistance and good processability.

The polydiorganosiloxane-polycarbonate block copolymers to be used according to the invention are either described in the literature (see for example U.S. Pat. No. 3,189,662, U.S. Pat. No. 3,419,634, DE-OS (German Published Specification) No. 3,334,782 (Le A 22 594) or European Offenlegungsschrift No. 0,122,535 (Le A 22 594-EP) and European Offenlegungsschrift No. 0,135,795 (Le A 22 390-EP), or, insofar as prepared using specific chain terminators, are described in German Patent Application P No. 3,506,472.2 (Le A 23 654).

The polydiorganosiloxane-polycarbonate block copolymers described in the relevant literature are said to have improved mechanical properties at low temperatures (for example B. M. Beach, R. P. Kambour and A. R. Schultz, J. Polym. Sci., Polym. Lett. Ed. 12, 247 (1974)).

The block copolymers which are to be used according to the invention for use as component A are those based on the diphenols of the formula (I)

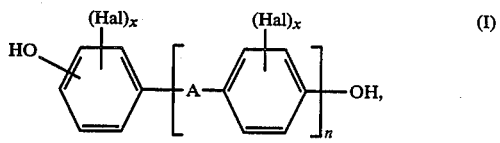

wherein "A" is a single bond, a $C_1$–$C_5$-alkylene, a $C_2$–$C_5$-alkylidene, A $C_5$–$C_6$-cycloalkylidene, —S— or —$SO_2$—, Hal is chlorine or bromine, "x" is 0, 1 or 2 and "n" is 1 or zero and of the formula (Ia)

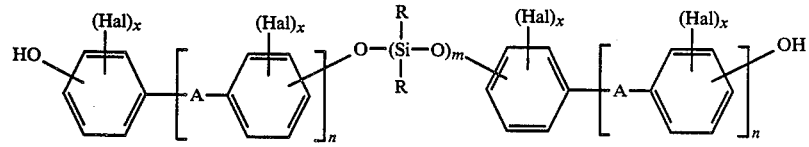

wherein "A", Hal, "x" and "n" have the meaning mentioned for formula (I), and the R's are identical or different and are the linear $C_1$–$C_{20}$-alkyl, branched $C_3$–$C_{20}$-alkyl or $C_6$–$C_{20}$-aryl, preferably $CH_3$, and "m" is a whole number between 5 and 100, preferably between 20 and 80, and where the proportion by weight of diphenols of the formula (Ia) in the copolycarbonates is in each case apportioned in such a way that the content of diorganosiloxy units

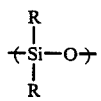

in the copolycarbonate is between 1% by weight and 25% by weight, preferably between 2% by weight and 15% by weight.

The diphenols of the formula (I) are either described in the literature or preparable by methods described in the literature; polydiorganosiloxanes having hydroxyaryloxy end groups as per the formula (Ia) are likewise known (see for example U.S. Pat. No. 3,419,634) or preparable by methods described in the literature.

The preparation of the polycarbonates which are suitable according to the invention for use as component A is described in the literature and can be effected for example with phosgene by the phase interface process or with phosgene by the process in homogeneous phase (the so-called pyridine process), in which the molecular weight to be set in each case is obtained in known manner by means of an appropriate amount of known chain terminators (see for example DE-OS (German Published Specification) No. 3,334,782 (Le A 22 594)).

Suitable chain terminators are for example phenol, p-chlorophenol, p-tert.-butylphenol and 2,4,6-tribromophenol.

In addition, German Patent Application P No. 35 06 472.2 (Le A 23 654) describes the preparation of block copolymers with monoalkylphenol or dialkylphenols with a total of 8 to 20 C atoms in the alkyl substituents, the chain terminators mentioned being for example p-isooctylphenol, p-nonylphenol, 3,5-di-tert.-butylphenol, p-tert.-octylphenol, p-dodecylphenol, 2-(3,5-dimethylheptyl)-phenol and 4,-(3,5-dimethylheptyl)-phenol.

The amount of chain terminator to be used is in general between 0.5 mol-% and 10.0 mol-%, relative to the sum of diphenols (I)+(Ia) used in each case.

The polycarbonates which are suitable according to the invention for use as component A have weight average molecular weights ($\overline{M}_w$, measured for example by ultracentrifugation or scattered light measurement) of 10,000 to 200,000, preferably of 20,000 to 80,000.

Suitable diphenols of the formula (I) are for example hydroquinone, resorcinol, 4,4'-dihydroxydiphenyl, 2,2-bis-(4-hydroxyphenyl)-propane, 2,4-bis-(4-hydroxyphenol)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and 2,2-bis-(3,5-dibromo-4-hydroxyphenyl)-propane.

Preferred diphenols of the formula (I) are 2,2-bis-(4-hydroxyphenol)-propane, 2,2-bis-(3,5-dichloro-4-hydroxyphenyl)-propane, 2,2-bis-(3,5-dibromo-4-hydroxyphenyl)-propane, and 1,1-bis-(4-hydroxyphenyl)-cyclohexane.

Suitable diphenols of the formula (Ia) are those in which R is methyl, ethyl, propyl, n-butyl, tert.-butyl and phenyl.

Preferred diphenols of the formula (Ia) are those of the formula (Ib)

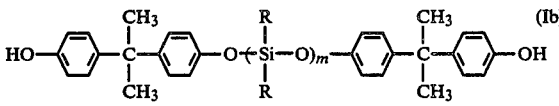

wherein the R's are identical and have the abovementioned meaning, i.e. denote methyl etc. and phenyl and "m" again is a whole number between 5 and 100, preferably between 20 and 80.

The diphenols of the formula (Ia) can be prepared for example from the corresponding bis-chloro compounds (II)

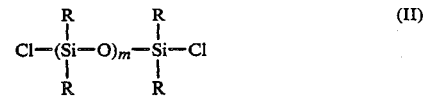

and the diphenols (I) for example as described in U.S. Pat. No. 3,419,634, column 3 in combination with U.S. Pat. No. 3,182,662.

In the bis-chloro compounds (II), R and "m" have the meaning as in the diphenols (Ia) and (Ib).

The polycarbonates which are suitable according to the invention for use as component A can be branched in the known way, namely preferably by the incorporation of 0.05 to 2.0 mol-%, relative to the sum of the diphenols used, of trifunctional or more than trifunctional compounds, for example those having three or more than three phenolic OH groups.

The sytrene/maleic anhydride copolymers which are suitable according to the invention for use as components B have a random structure. Such random copolymers can preferably be prepared from the corresponding monomers through a continuous mass or solution polymerization with incomplete conversions.

In place of styrene, the polymers can also contain ring-substituted styrene such as p-methylstyrene, vinyltoluene, 2,4-dimethylstyrene and/or other substituted styrenes such as α-methylstyrene.

The molecular weights of the random styrene/maleic anhydride copolymers which are suitable according to the invention for use as components B can vary over a wide range. These products preferably have a limiting viscosity number [η] of 0.3–0.9 (meausred in dimethylformamide at 25° C.; see in this context Hoffman, Krömer, Kuhn, Polymeranalytik I [Polymer Analysis I], Stuttgart 1977, page 316 et seq.).

To prepare the graft polymers for use as component C, suitable rubbers are in particular polybutadiene, butadiene/styrene copolymers having up to 30% by weight, relative to the weight of the rubber, of a low alkyl ester of acrylic or methacrylic acid (for example methyl methacrylate, ethyl acrylate, methyl acrylate or ethyl methacrylate). Further suitable rubbers are for example polyisoprene or polychloroprene. Also suitable are alkyl acrylate rubbers based on $C_1$–$C_8$-alkyl acrylates, in particular ethyl acrylate, butyl acrylate, ethylhexyl acrylate. These alkyl acrylate rubbers can, where appropriate, contain up to 30% by weight, relative to the weight of the rubber, of monomers such as vinyl acetate, acrylonitrile, styrene, methyl methacrylate and/or vinyl ethers in copolymerized form. These alkyl acrylate rubbers can further contain minor amounts, preferably up to 5% by weight, relative to the weight of the rubber, of ethylenically unsaturated monomers with a crosslinking action. Such crosslinkers are for example alkylenediol di(meth)-acrylates, polyester di-(meth)-acrylates, divinylbenzene, trivinylbenzene, triallyl cyanurate, allyl (meth)-acrylate, butadiene or isoprene. Such alkyl acrylates are known. Acrylate rubbers to be grafted can also be products which contain a crosslinked diene rubber composed of one or more conjugated dienes, such as polybutadiene or a copolymer of a conjugated diene with an ethylenically unsaturated monomer, such as styrene and/or acrylonitrile, as core.

Other suitable rubbers are for example EPDM rubbers, i.e. rubbers made of ethylene, propylene and an unconjugated diene monomer. Preferred rubbers for preparing the graft polymers C are diene and alkyl acrylate rubbers.

The rubbers are present in the graft polymer C in the form of at least partly crosslinked particles having an average particle size of 0.09 to 5 μm, in particular 0.1 to 1 μm. The graft polymers C are prepared by free radical graft polymerization of the above-defined monomer mixtures from C.1.1 and C.1.2 in the presence of rubbers C.2 to be grafted, and are all known.

Preferred processes for preparing the graft polymers C are emulsion, solution, mass or suspension polymerization. Particularly preferred graft polymers C are the so-called ABS polymers. Ring-substituted styrenes to be mentioned are halogenostyrenes and p-methylstyrene.

The thermoplastic moulding compositions according to the invention can contain further additives known for polycarbonates, styrene/maleic anhydride copolymers or for graft polymers, such as flameproofing agents, flow control agents, stabilizers, pigments, release agents and/or antistatics.

The moulding compositions according to the invention which contain the components A, B, C and, where appropriate, further known additives such as flameproofing agents, fluxers, stabilizers, pigments, release agents and/or antistatics are prepared by mixing the particular constituents in the known way and melt-compounding or melt-extruding the mixture at temperatures of 220°–330° C. in customary machines such as internal kneaders or single- or two-screw extruders, or by mixing the solutions of the particular components in suitable organic solvents, for example in chlorobenzene, and evaporating the solvent mixtures in conventional machines, for example in evaporating extruders.

The present invention thus also relates to a process for preparing thermoplastic moulding compositions which contain components A, B, C and, where appropriate, flameproofing agents, flow control agents, stabilizers, pigments release agents and/or antistatics, which is characterized in that the components A, B and C, and, where appropriate, flameproofing agents, flow control agents, stabilizers, pigments, release agents and/or antistatics, are after mixing melt-compounded or melt-extruded at temperatures of 220°–330° C. in customary machines, or that the solutions of these components in suitable organic solvents are after mixing evaporated in customary apparatuses.

The moulding compositions of the present invention can be used for preparing mouldings of any kind. In particular, mouldings can be prepared by injection moulding. Examples of preparable mouldings are: housing parts of any kind (for example for appliances such as coffee machines or blenders) or cover sheets for the building industry and parts for the automotive sector. They are also used in the field of electrical engineering, since they have very good electric properties.

A further form of processing is the preparation of mouldings by deep-drawing or hot-forming previously extruded sheets or films.

EXAMPLES

Alloy components used

A.1

A copolycarbonate based on bisphenol A and 5% by weight of polydimethylsiloxane of block length ($\bar{P}_n$) 40, having a relative solution viscosity of 1.31, measured in $CH_2Cl_2$ at 25° C. and a concentration of 0.5% by weight, prepared by using phenol as a chain terminator, in accordance with DE-OS (German Published Specification) No. 3,334,782.

A.2

Homopolycarbonate based on bisphenol A with a relative solution viscosity of 1.32, measured in $CH_2Cl_2$ at 25° C. and a concentration of 0.5% by weight, prepared by using phenol as the chain terminator.

C.

SAN graft polymer of 50% of a styrene/acrylonitrile mixture (in a weight ratio of 72:28) on 50% of particulate polybutadiene having an average particle size ($d_{50}$) of 0.4 μm, obtained by emulsion polymerization.

Prepartion of copolymer resins B

A jacketed vessel which is equipped with internal thermometer, stirrer, inlet and outlet is charged with 750 parts of a mixture having a composition as per Table 1, and the temperature is raised to 130° C. Then a monomer stream of 110 parts of the same composition is metered in in such a way, and at the same time the same amount of polymer solution is removed from the vessel, that the level of fill in the vessel is maintained. About 0.05 part/h of tert.-butyl perpivalate (75% strength in dibutyl phthalate) are continuously added to the monomer stream. After about 2 h a constant conversion of about 40% has become established. The polymer solution has added to it 0.1% by weight of 2,6-di-t-butyl-p-cresol and is then freed from monomers and volatile constituents on an evaporating extruder.

The componding of components A, B and C were effected on a 3-L internal kneader at temperatures between 200° and 220° C.

The preparation of the mouldings are effected on an injection moulding machine at 260° C.

The determination of the heat distortion resistance according to Vicat (method B) was effected in accordance with DIN 53,460.

The determination of the notched impact strength according to Izod was effected on rods measuring $2.5 \times \frac{1}{2} \times \frac{1}{8}''$ in accordance with ASTM-D-256 or in line with DIN 53,453/ISO R 179 on rods measuring $50 \times 6 \times 4$ mm, the rods having been equipped with a V-shaped notch of 2.7 mm in depth for the notched impact strength.

Table 2 reveals the exact composition of the moulding compositions tested and the test data obtained.

Particle size always means average particle diameter $d_{50}$, determined by ultracentrifuge by the method of W. Scholtan et al., Kolloid-Z. u. Z. Polymere 250 (1972) 782–796.

Table 2 shows that in general mixtures of polydiorganosiloxane-polycarbonate block copolymers and styrene/maleic anhydride copolymers are superior to corresponding mixtures based on a pure bisphenol A-polycarbonate.

It is true that the addition of small amounts of graft rubber increases the impact strength in both cases, but the trials in accordance with the invention (assuming equal polycarbonate content) give distinctly better results and/or a high impact strength level is obtained with distinctly lower levels of block copolycarbonate. As a result it is possible to obtain products of improved flowability (processability).

As the trials in accordance with the invention show, the extremely high impact strength is essentially obtained while retaining a high heat distortion resistance.

TABLE 1

| | Composition of starting monomers and of copolymers B | | | | |
|---|---|---|---|---|---|
| | Starting monomers (% by weight) | | Copolymer (% by weight) | | Limiting viscosity |
| | Styrene | Maleic anhydride | Styrene | Maleic anhydride | number of copolymer |
| B 1 | 93.8 | 6.2 | 84.5 | 15.5 | 0.514 |
| B 2 | 93.2 | 6.8 | 83 | 17 | 0.518 |

TABLE 2

| | | | | | | | | | |
|---|---|---|---|---|---|---|---|---|---|
| A 1 (parts by weight) | 80 | 80 | | | | 35 | 50 | 35 | 50 |
| A 2 (parts by weight) | | | 80 | 80 | 80 | | | | |
| B 1 (parts by weight) | | 20 | | | 20 | 65 | 50 | 65 | 50 |
| B 2 (parts by weight) | 20 | | 20 | 20 | | | | | |
| C (parts by weight) | | 3 | | 3 | 3 | | | 3 | 3 |
| Notched impact strength, (DIN) Room temperature (kJ/m$^2$) | 31 | 69 | 18 | 41 | 31 | 2.4 | 17.3 | 12.8 | 21.4 |
| Notched impact strength (Izod) Room temperature (kJ/m$^2$) | | 1030 | 241 | 830 | 847 | | | | |
| Heat Distortion resistance (Vicat b) (°C.) | 142 | 138 | 145 | 145 | 144 | 136 | 138 | 136 | 138 |

We claim:

1. A thermoplastic moulding composition containing
(A) 10 to 95 parts by weight, relative to 100 parts by weight of A+B, of polydiorganosiloxanepolycarbonate block copolymer having an average molecular weight $\overline{M}_w$, by ultracentrifugation or scattered light, of 10,000–200,000 and having a content of aromatic carbonate structure units between 75% by weight and 99% by weight and a content of diorganosiloxy units between 25% and 1.0% by weight, the block copolymers being prepared, starting from polydiorganosiloxanes containing α,ω-bishydroxyaryloxy end groups, with a degree of polymerization $\overline{P}_n$ of 5 to 100,
(B) 5 to 90 parts by weight, relative to 100 parts by weight of A+B, of a random copolymer of 95–70% by weight of styrene, α-methylstyrene or ring-substituted styrenes or mixtures of said vinyl aromatics and 5–30% by weight of maleic anhydride, and
(C) 1.0 to 3.0 parts by weight, relative to 100 parts by weight of A+B, of one or more graft polymers of
 (1) 5 to 90 parts by weight of a mixture of
  (i) 50 to 95% by weight of styrene, α-methylstyrene, ring-substituted styrene, methacrylate or mixtures thereof and
  (ii) 50 to 5% by weight of (meth)acrylonitrile, methyl methacrylate, maleic anhydride, N-substituted maleimide or mixtures thereof, on
 (2) 95 to 10 parts by weight, of a rubber having a glass transition temperature ≦10° C.

2. A moulding composition according to claim 1, in which component (A) is a mixture of polydiorganosiloxane-polycarbonate block copolymers with conventional, siloxane-free thermoplastic polycarbonates, in which the total content in diorganosiloxy units in this polycarbonate mixture is again between 1.0% by weight and 25% by weight.

3. A moulding composition according to claim 1 in which the block copolymers of component (A) are prepared with a degree of polymerization $\overline{P}_n$ of 20 to 80.

4. A moulding composition according to claim 1, which contains 25 to 95 parts by weight of component (A) and 5 to 75 parts by weight of component (B).

5. A moulding composition according to claim 1, in which component (B) is composed of 90–75 % by weight of styrene, α-methylstyrene or ring-substituted styrenes or mixtures of said vinyl aromatics and 10 to 25% by weight of maleic anhydride.

6. A moulding composition according to claim 1, in which component (C) is composed of 30 to 80 parts by weight of component (1) and 70 to 20 parts by weight of component (2).

7. A moulding composition according to claim 1, in which the block copolymer(s) of component (A) are based on diphenols selected from 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

8. A moulding composition according to claim 1, in which the copolymer of component (B) is of copolymer of maleic anhydride with one or more of p-methylstyrene, vinyltoluene, 2,4-dimethylstyrene or α-methylstyrene.

9. A moulding composition according to claim 1, in which the rubber of the graft polymer of component (C) is a diene or alkyl acrylate rubber.

10. A moulding composition according to claim 1, containing at least one additive selected from flameproofing agents, flow control agents, stabilizers, pigments, release agents and antistats.

11. A process for the production of a moulding composition according to claim 1, in which a solution of components (A), (B) and (C) in organic solvents therefore are mixed and the solvent mixture is then evaporated in an evaporating unit.

12. A process for the production of a moulding composition according to claim 11 wherein (A), (B) and (C) are mixed with at least one additive selected from flameproofing agents, flow control agents, stabilizers, pigments, release agents and antistats in the mixture or solution.

* * * * *